METHOD FOR IMPROVING PERFECTION OF EPITAXIALLY GROWN GERMANIUM FILMS
Original Filed May 6, 1968
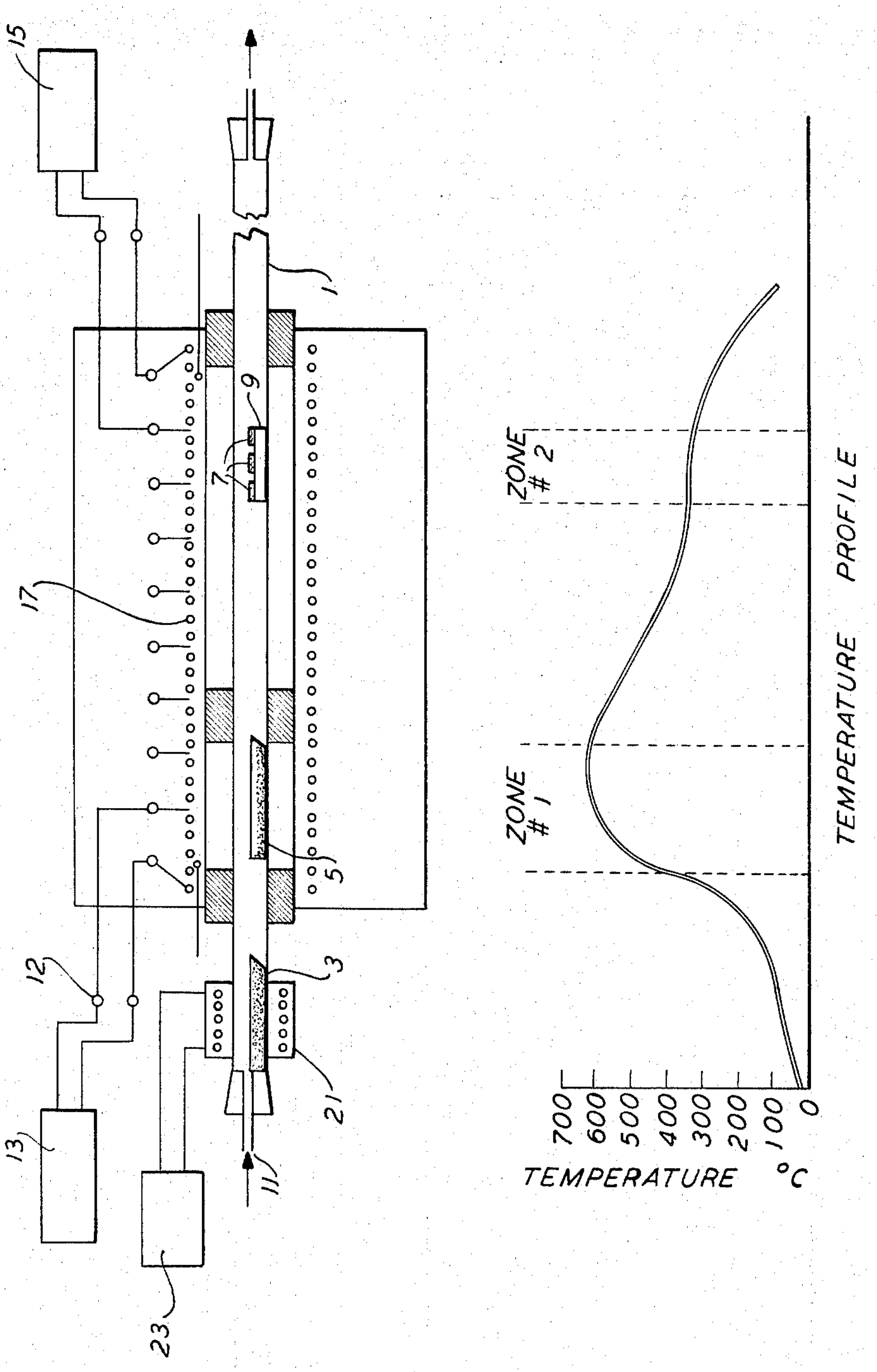
INVENTOR
RALPH F. TRAMPOSCH
BY [signature]
ATTORNEY United States Patent Office 3,783,009
Patented Jan. 1, 1974

3,783,009

METHOD FOR IMPROVING PERFECTION OF EPITAXIALLY GROWN GERMANIUM FILMS

Ralph F. Tramposch, Amherst, N.Y., assignor to Air Reduction Company, Incorporated, New York, N.Y.

Continuation of abandoned application Ser. No. 726,952, May 6, 1968. This application Feb. 22, 1971, Ser. No. 117,668
Int. Cl. B44d *1/02*
U.S. Cl. 117—106 A 4 Claims

ABSTRACT OF THE DISCLOSURE

A method for improving the crystalline perfection of epitaxial films of germanium is set forth, which is particularly applicable to forming a device-quality layer on a foreign substrate. In this latter environment, the process is carried out by vapor depositing on the foreign substrate a germanium single crystal base film at temperatures in the range of 800° C. to 825° C., epitaxially vapor depositing a buffer germanium layer on said base film at temperatures in the range 340° C to 360° C., and thereafter epitaxially depositing a layer of germanium at a higher temperature range of 700° C. and above.

CROSS REFERENCE TO RELATED APPLICATION

This application is a continuation of copending application Ser. No. 726,952, filed May 6, 1968, now abandoned, for Method for Improving Perfection of Epitaxially Grown Germanium Films.

BACKGROUND OF THE INVENTION

This invention relates generally to methodology useful in improving the crystal perfection of epitaxially-grown films of germanium. The invention relates in particular to a technique of this type applicable to producing device-quality epitaxial layers of germanium on foreign substrates. However, as will hereinafter be pointed out, the techniques of the invention are also applicable where one desires to improve the quality of single crystal germanium which has been epitaxially deposited on a base of single crystal germanium.

The process of the present invention, as has been suggested in the prior paragraph, has particular applicability to improving epitaxial layers of germanium deposited on foreign substrates. The invention in this sense, may be regarded as an improvement upon the invention disclosed in my copending application Ser. No. 542,422, filed Apr. 13, 1966, now abandoned, entitled "Hetero-Epitaxial Growth of Germanium on Sapphire," and assigned to the same assignee as the present application. In this copending application I have disclosed my discovery that single crystal germanium layers possessing electron mobilities approaching that found in bulk single crystal germanium, can be heteroepitaxially grown on sapphire, i.e. on single crystal aluminum oxide. This heteroepitaxial growth is accomplished in a vapor deposition process system, by mounting a germanium source in a closely spaced sandwich arrangement with a sapphire substrate, purging the system to create an inert atmosphere, introducing a suitable carrier gas such as pure hydrogen into the system, heating the source to approximately 850° C., heating the substrate to 25° to 50° C. less than the source, and exposing the entire assembly to water vapor introduced into the carrier stream of hydrogen.

Although the electrical characteristics of films prepared in accordance with the invention of my copending application have, in fact, approached that of bulk material, it has nevertheless been found that such single crystal films yet contain many crystal defects which limit their usefulness as active device material. In particular, investigation has disclosed the existence of stacking faults in numbers seriously impairing the utility of the materials. To obtain useful minority-carrier active devices in germanium on sapphire, therefore, it is accordingly evident that a significant improvement in film perfection is required. In connection with the problem outlined here, it should, of course, be appreciated that the existence of crystalline imperfections—and in particular the existence of extensive stacking faults—is not in any sense a problem limited to the environment cited, viz that of hetero-epitaxially grown germanium crystals; the same defect is present as well in numerous instances where the germanium crystal is grown according to conventional homo-epitaxial techniques, that is to say, the same problem occurs in those instances where epitaxial growth of germanium on germanium is effected.

In accordance with the foregoing, it may be regarded as an object of the present invention to provide a method according to which the degree of perfection of epitaxially-grown films of germanium on foreign substrates may be greatly augmented.

It is a further object of the present invention to provide a process enabling formation of device-quality epitaxial layers of germanium upon foreign substrates, or upon substrates of single crystal germanium lacking the degree of perfection to enable device formation.

It is yet an additional object of the invention to provide a method which modifies a layer of single-crystal germanium so as to greatly reduce the number of stacking faults effectively present therein.

SUMMARY OF THE INVENTION

Now in accordance with the present invention, it has been found that the objects previously set forth may be achieved by practice of a method according to which one applies to a relatively imperfect single-crystal base germanium layer previously formed on a foreign substrate or on a germanium bulk wafer, a buffer layer of germanium, by epitaxial deposition at a temperature in the range of about 340° to 360° C. Subsequently, a third layer of germanium is epitaxially grown on the buffer layer by deposition at the normal temperature range of 700° C. or more. Examination of the multiple layer germanium films resulting from application of the sequential procedure set forth, thereupon reveals the surprising result that crystalline imperfections, principally stacking faults originating in the base film, are not propagated through the buffer into the overlying epitaxial layer. In consequence, the total number of imperfections in the overlying layer is greatly reduced, and said layer is found to be well-suited for formation therein of active devices—a result quite at variance with the qualities exhibited by the base layer.

BRIEF DESCRIPTION OF DRAWING

The single figure appended hereto diagrammatically illustrates apparatus used in accordance with the invention for depositing the low temperature-formed buffer layer.

DESCRIPTION OF PREFERRED EMBODIMENTS

For purposes of concretely illustrating the present invention, it may be assumed that initially a relatively imperfect single crystal base layer of germanium is prepared upon a base material of sapphire (single crystal aluminum oxide), in accordance with the heteroepitaxial growth process set forth in my copending application Ser. No. 542,422, previously alluded-to. Pursuant to such methodology the base layer will be grown at a preferred temperature range of 800° to 825° C. (However, it should be noted that in the more general case—where the base layer is grown on a germanium base—the temperature range can run from as low as 700° C., for pyrolytic deposition, to about 850° C.) Typically, the thicknesses of the germanium base layer resulting from application of these prior techniques will have values in the range of 20 to 40 microns. As has also been previously indicated, examination of such base layers indicates the presence of numerous stacking faults and, accordingly, such materials are not deemed sufficiently perfect to allow their effective use in the fabrication of bipolar or minority-carrier active devices. In accordance now with the present invention, the sapphire wafers bearing the overlying base layer of single crystal germanium are subjected to a process which will result in production of a device-quality germanium layer thereon.

The single figure appended hereto diagrammatically illustrates apparatus used in accordance with the invention for application to the imperfect base layer, of the buffer germanium layer found to control propagation of imperfections. The apparatus of the figure—which does not per se form part of the invention—consists basically of an open quartz tube 1, positioned in a two zone furnace. Pure iodine vapor is generated by heating semiconductor grade iodine crystals (99.9999% purity available, for example, from Gallard-Schlessinger Company, Long Island, N.Y.), which are deposited in quartz boat 3. The iodine vapor reacts with the germanium source charge placed in quartz boat 5 in zone No. 1 at a temperature of approximately 625° C. to form $GeI_4$. Most of the $GeI_4$ reacts with the germanium source of quartz boat 5 in accordance with the well-known disproportionation reaction:

$$Ge+GeI_4 \rightleftarrows 2GeI_2$$

In zone No. 2, identified with respect to the apparatus by the temperature profile diagram underlying the apparatus depiction, temperatures are maintained in the range of 340° to 360° C. Here the reaction proceeds to the left and germanium is deposited upon the substrates, such as those shown at reference numeral 7 atop quartz pedestal 9. Typically in apparatus of the type depicted herein, argon entering port 11 is used as the carrier gas, a flow rate of the order of 25 cc./min. being used to obtain the optimum efficiency and transport of germanium. In the apparatus depicted, the temperatures within the two-zone furnace are maintained within as little as 1° of set point by the use of temperature controllers and power supplies, as at 13 and 15. The latter act by applying a suitable potential to terminals 12 and 10 which are connected to appropriately apply the stated potentials to portions of heater element 17. A separate heater 21, with its own power supply and temperature controller 23, is used to vaporize the iodine crystals in a temperature range of 50° C. to 110° C., to generate the required iodine concentration.

All substrates, such as that depicted in the figure at reference numeral 7, are prepared for deposition and the ensuing epitaxial growth of the germanium buffer layer by mechanical and chemical polishing, and by ultrasonic cleaning. In those instances where slices of germanium alone are used as substrates, the sample is typically lapped with 600 grit silicon carbide and then given a prolonged etch. Films of germanium on saphire, on the other hand, are usually lightly polished such as by means of a 3-micron alumina composition and chemically polished in a weak solution of $HF:HNO_3:H_2O_2:H_2O(1:1:1:4)$ to remove a minimum amount of material.

Film thicknesses of the epitaxial buffer layer produced in accordance with the procedure set forth, are determined by weight measurements using a Mettler micro-balance. In accordance with the present invention, it was found that a thickness for this buffer layer in the range of 2 to 5 microns was preferable.

Subsequent to production of the overlying buffer layers at the 340° to 360° C. deposition temperatures of the second zone of furnace 1, the substrates were removed from the apparatus and thereafter subjected to processes for epitaxial growth of an overlying germanium layer, which processes were then in accord with conventional techniques for growth of such materials. Thus, for example, such overlying layers were grown in accordance with the usual chemical vapor deposition techniques using the wet hydrogen process at approxiately 800° C. These overlying layers of single crystal germanium were typically deposited to a thickness of at least 10 microns, the uppermost limit being varied according to the use contemplated—in some cases being as high as 50 or 100 microns.

The multi-layered epitaxial films produced in accordance with the process set forth can, therefore, now be seen to consist of three elements:

(1) a germanium single crystal base film, which is either formed in the conventional manner upon a germanium substrate, or is formed in accordance with the methodology of my application Ser. No. 542,422 on a foreign substrate of sapphire;

(2) a buffer layer of germanium epitaxially grown upon the base layer at a temperature in the vicinity of 340°–360° C.; and (3) an overlying single crystal layer of germanium, epitaxially grown atop the buffer layer by deposition at the normal temperatures for growth of such materials, viz temperatures in the range vicinity of 800° C. (more generally between about 700° and about 850° C.).

The superior device quality of multi-epitaxial germanium layers grown in accordance with the present invention has been established by direct observation. For example, photomicrographs of an etched surface of such multi-epitaxial layers deposited on a base film on sapphire, have been compared with a single germanium layer grown on sapphire at the high temperatures utilized in my copending application. In such photographs the diminution (and virtual disappearance) of stacking faults is quite evident and dramatic. Multi-epitaxial layers grown in accordance with the invention have also been experimentally found to have far superior electrical characteristics, as compared to single germanium layers grown directly on sapphire. In one experiment, for example, films of the contrasting type specified, were processed identically to form diffused p-n junctions and mesa diode arrays. The current-voltage characteristics of diodes fabricated in the multi-epitaxial film were thereupon found to be far superior to those of diodes formed in the single epitaxial film. In the latter case, the diodes exhibited higher leakage currents and a soft reverse voltage breakdown as compared with the highly acceptable diodes found in the multi-epitaxial layer. It is, of course, believed that the difference between the electrical characteristics of diodes fabricated in single epitaxial layers and those diffused in multi-epitaxial layers is due to the presence of stacking faults.

While the present invention has been described in terms of specific embodiments thereof, it will be understood that in view of the present disclosure, numerous modifications of the invention may now be readily devised by those skilled in the art, which modifications will yet not depart from the true scope of the present teaching. For example, even though the present invention has been largely described in terms of a several-step process involving growth in discrete environments of a first germanium layer on a buffer layer, and then of an overlying device-quality layer, it is evident that the essence of the invention resides in growth of a low temperature-formed buffer layer between layers formed at normal (high) temperatures. If one regards the invention in this generalized way, it is evident that the process could, for example, be carried out in a single environment by merely initiating epitaxial growth for a period at the normal high temperatures, and then shifting temperatures to the lower 350° value for a period sufficient to enable development of the buffer. In consideration of factors such as these, it is evident that the invention is to be broadly construed and limited only by the claims now appended hereto.

I claim:

1. A method for producing an epitaxial layer of germanium substantially free of stacking fault imperfections on a sapphire substrate which comprises:

(a) vapor depositing on said substrate a germanium single crystal base film at a temperature over 700° C.;

(b) epitaxially vapor depositing a buffer germanium layer on said base film at a temperature in the range of 340° C. to 360° C., and (c) epitaxially vapor depositing another germanium layer on said buffer layer at a temperature above 700° C.

2. A method for improving the crystal perfection of a single crystal germanium layer epitaxially deposited on a sapphire substrate at a temperature over 700° C., comprising:

(a) epitaxially vapor depositing on said layer a germanium buffer layer derived from germanium iodide at a temperature of the order of 350° C., and (b) thereafter epitaxially depositing a single crystal germanium layer atop said buffer layer at a temperature over 700° C.

3. A method for eliminating the propagation of stacking fault imperfections in a first layer of germanium epitaxially grown on a sapphire substrate at a temperature over 700° C., comprising:

(a) depositing on said layer of germanium a second layer of germanium epitaxially deposited from germanium iodide vapor at a temperature from 340° C. to 360° C., said second layer being in the range of from about 2 microns to about 5 microns in thickness, and (b) thereafter epitaxially depositing a third layer of germanium on said second layer by the wet hydrogen chemical vapor deposition process at a temperature between 700° C. and 850° C., said third layer having a thickness of more than 10 microns.

4. An article of manufacture comprising:

(a) sapphire substrate support means;

(b) a germanium single crystal base layer epitaxially grown on said support means at temperatures over 700° C. containing stacking faults as crystalline imperfections;

(c) a germanium buffer layer of 2 to 5 microns thickness epitaxially grown on said base layer at temperatures in the range of 340° C. to 360° C.; and (d) a device-quality germanium layer of more than 10 microns thickness substantially free of stacking faults epitaxially grown on said buffer layer at temperatures over 700° C.

References Cited

UNITED STATES PATENTS

| | | | |
|---|---|---|---|
| 3,563,716 | 2/1971 | Shinya Iide et al. | 117—106 A |
| 3,473,978 | 10/1969 | Jackson | 148—175 |
| 3,476,592 | 11/1969 | Berkenblit | 117—201 |

EDWARD G. WHITBY, Primary Examiner

U.S. Cl. X.R.

117—201; 148—174, 175